No. 709,235. Patented Sept. 16, 1902.
L. F. A. MONNERET.
MACHINE FOR CUTTING HELICOIDAL GEAR TEETH.
(Application filed Dec. 14, 1899.)
(No Model.)
6 Sheets—Sheet 1.
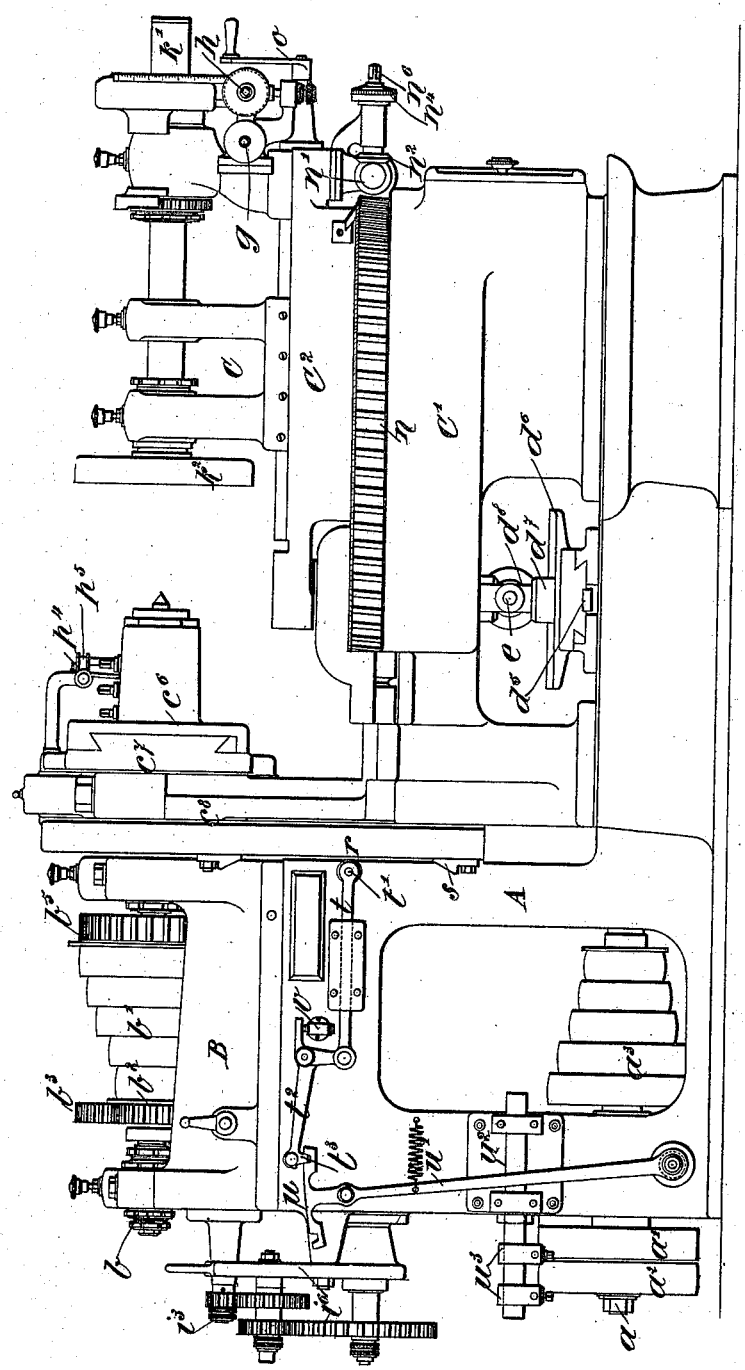

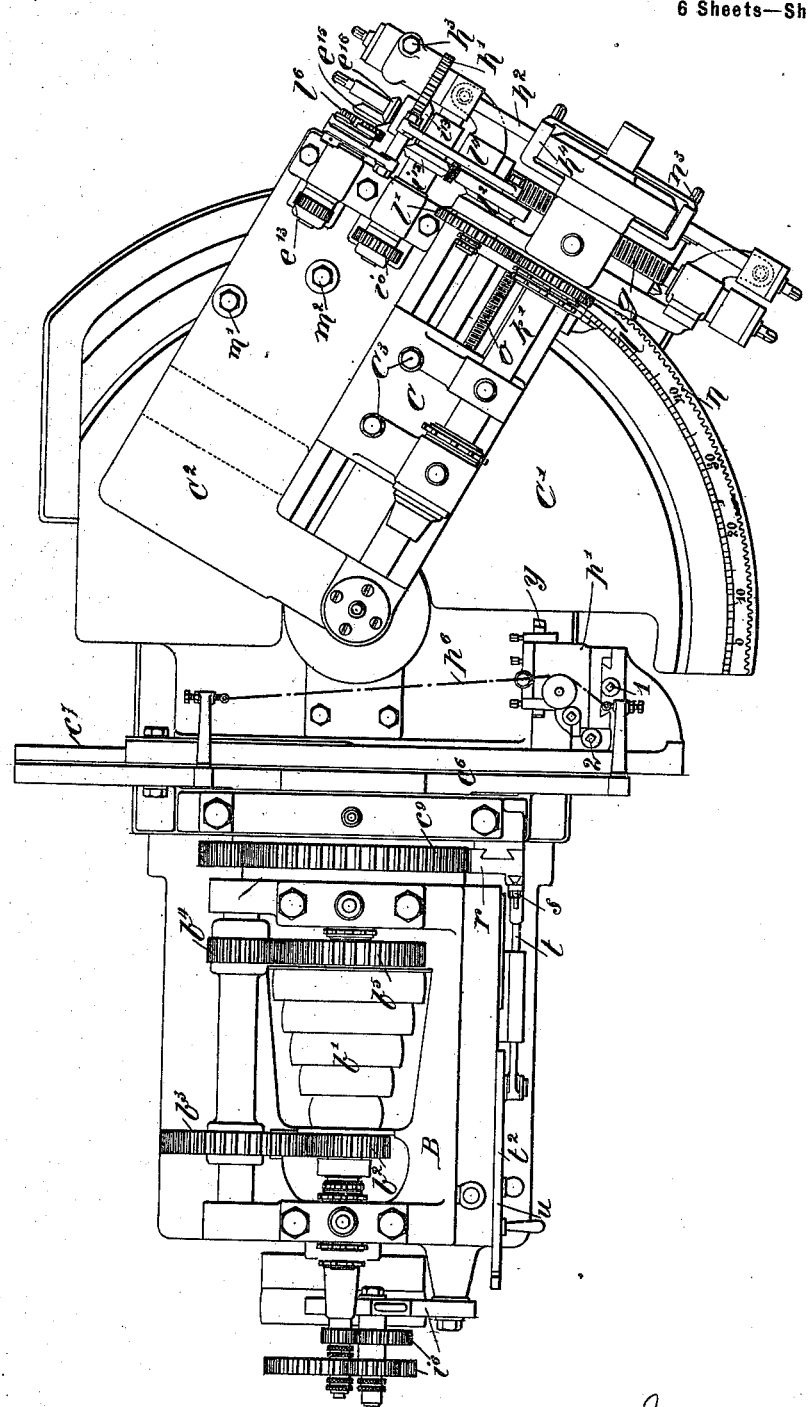

No. 709,235. Patented Sept. 16, 1902.
L. F. A. MONNERET.
MACHINE FOR CUTTING HELICOIDAL GEAR TEETH.
(Application filed Dec. 14, 1899.)
(No Model.) 6 Sheets—Sheet 3.
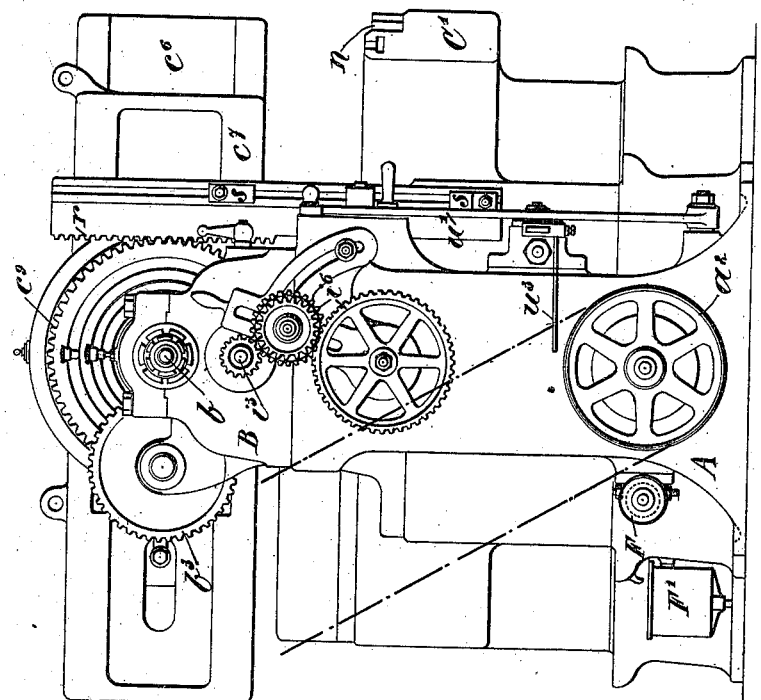
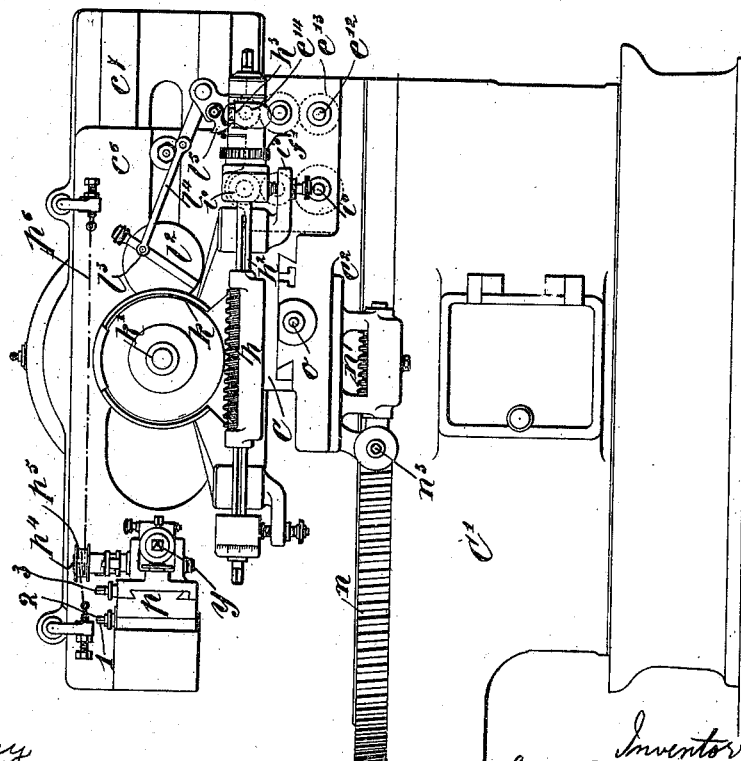

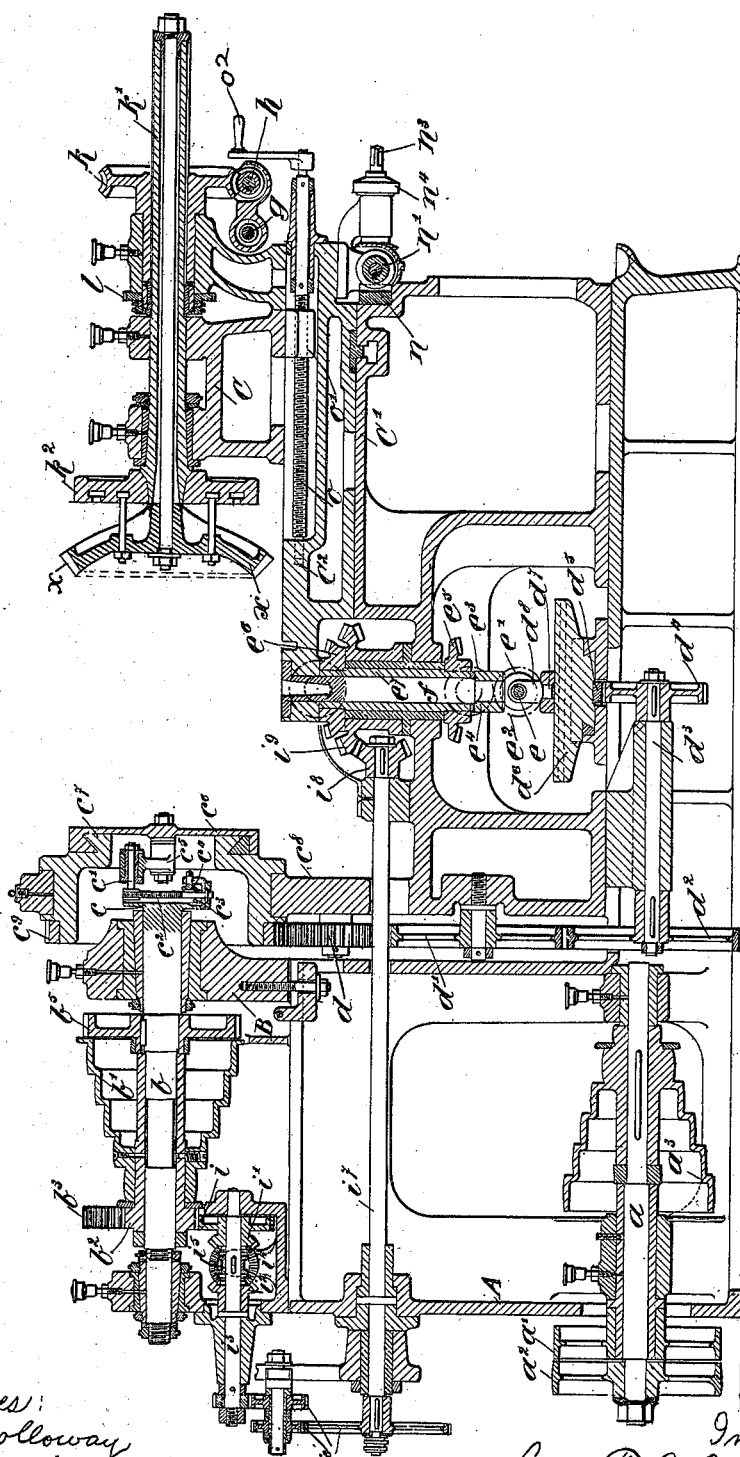

No. 709,235. Patented Sept. 16, 1902.
L. F. A. MONNERET.
MACHINE FOR CUTTING HELICOIDAL GEAR TEETH.
(Application filed Dec. 14, 1899.)
(No Model.) 6 Sheets—Sheet 5.
FIG. 6.
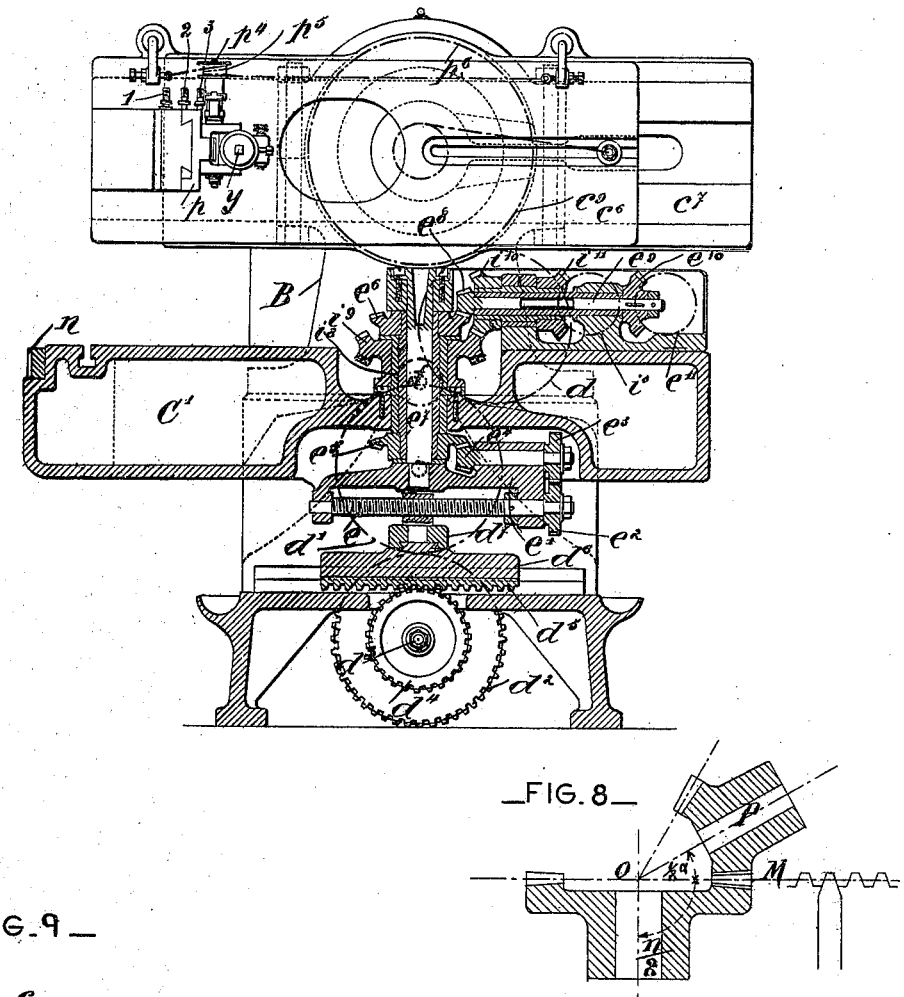
FIG. 9.
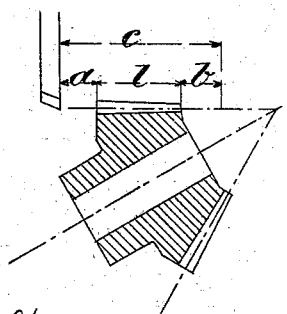
FIG. 8.
FIG. 10.
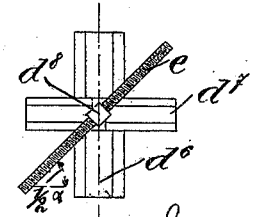
Witnesses:
C. Holloway
M. C. Pinckney
Inventor:
Léon F. A. Monneret
By J. E. W. Bowen
Attorney

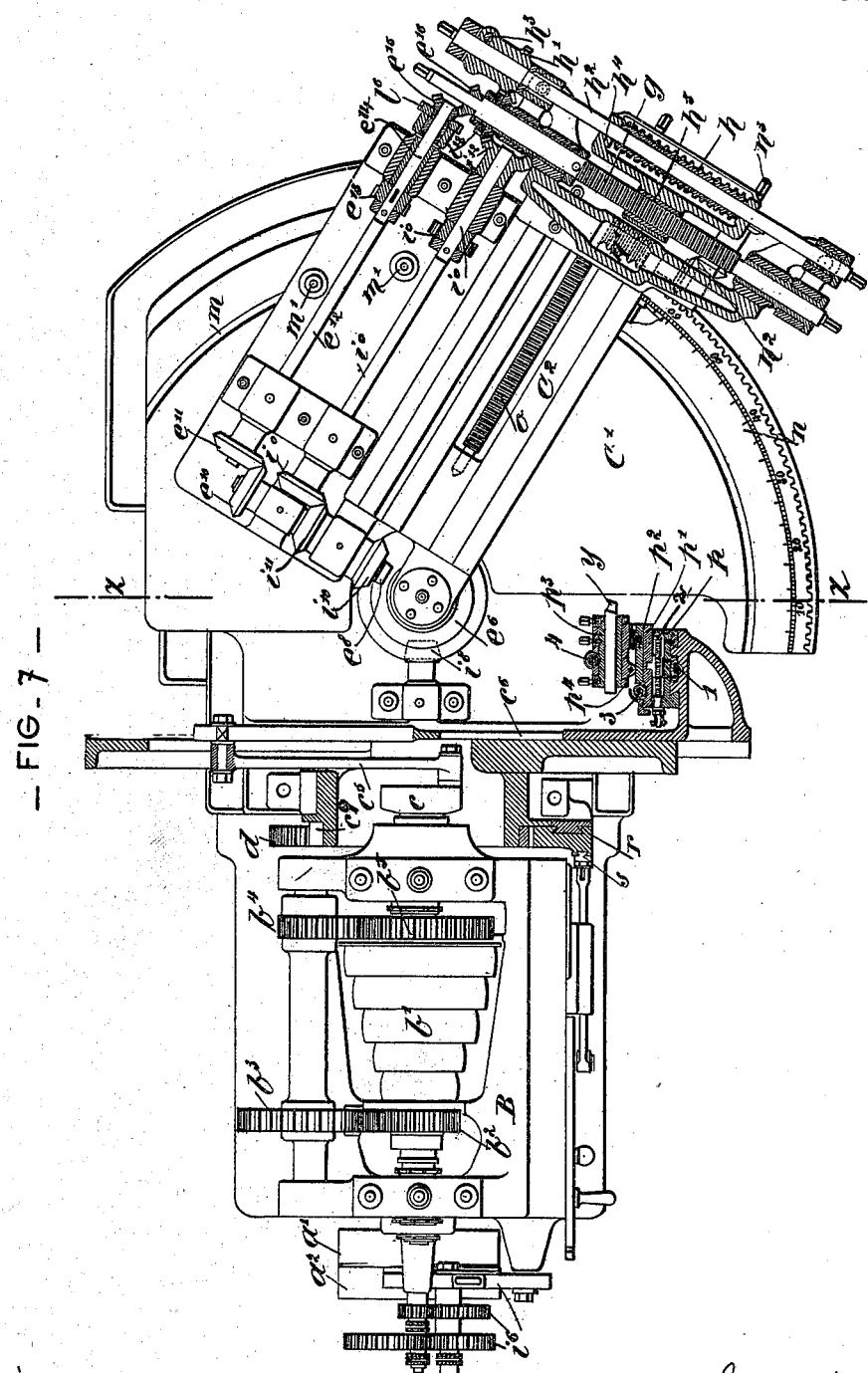

UNITED STATES PATENT OFFICE.

LÉON FRANÇOIS ACHILLE MONNERET, OF PARIS, FRANCE.

MACHINE FOR CUTTING HELICOIDAL GEAR-TEETH.

SPECIFICATION forming part of Letters Patent No. 709,235, dated September 16, 1902.

Application filed December 14, 1899. Serial No. 740,255. (No model.)

*To all whom it may concern:*

Be it known that I, LÉON FRANÇOIS ACHILLE MONNERET, engineer, a citizen of the Republic of France, residing at 169 Rue d'Alésia, Paris, France, have invented certain new and useful Improvements in or Relating to Machines for Cutting Helicoidal Teeth on Wheels, of which the following is a specification.

Theory and practice alike have demonstrated the fact that, as regards gear-wheels, helicoidal teeth produce a more easy and even motion than the straight-cut teeth. This is easily explained when it is remembered that, as regards straight-cut teeth, each tooth acts by coming successively into the plane of contact, whereas in the case of teeth cut in helicoidal form the tooth comes in contact with this plane progressively as regards each of its portions. Moreover, in the case where the axes are contained in the same plane, such cases being of especial interest in the present case, the friction in helicoidal-toothed gear is less than in straight-cut-toothed gear, and especially with regard to conical gear-wheels. A conical pinion with helicoidal teeth is therefore always preferable to a conical pinion with straight-cut teeth and can be advantageously substituted for it in all cases. On the other hand, the continued rise in the cost of skilled manual labor makes the employment of automatic machines which can be attended to by more or less unskilled attendants a great desideratum, and especially from the point of economy machines which do not require the use of a great number of similar parts would be of advantage. For these reasons I have devised a machine which will automatically cut helicoidal conical teeth on bevel-gears, which machine forms the subject-matter of the present invention. In the accompanying drawings I have represented such a machine by way of example only.

Figure 1 is a longitudinal elevation of the machine. Fig. 2 is a plan of the machine represented in Fig. 1. Figs. 3 and 4 are elevations of opposite ends of the machine. Fig. 5 is a vertical longitudinal section along the principal axis of the machine. Fig. 6 is a cross-section on the same principal axis. Fig. 7 is a plan view partly in section. Fig. 8 is a diagrammatic view representing for demonstration the engagement of a bevel-pinion with a limit-wheel, of which the pitch-cone is a plane. Fig. 9 is a diagrammatic view representing the position of the tool with regard to the cone to be cut. Fig. 10 is a diagrammatic view of the carriers and of the screw, representing the disposition of the mechanism which transmits to the tool a positive movement for giving the desired involute shape to the teeth.

The mechanism may be divided into six principal divisions—namely, "tool-reciprocating mechanism," "work-support," "mechanism for rotating the blank during the cutting to cause the tool to travel in a helical path on the periphery of the blank and to space the teeth," "mechanism for giving an additional rotation to the blank at the end of each revolution and for feeding the tool so as to produce the tooth-curve," "stop mechanism," and "lubrication."

*Tool-reciprocating mechanism.*—In a framework A is mounted in suitable bearings a shaft $a$, Fig. 5, provided with two pulleys $a'$ $a^2$, one of which is loose and the other fast and which receive a rotary movement from any system of transmission by means of a belt. On the shaft $a$ is keyed a stepped cone $a^3$, which by means of a belt transmits its movement to another similarly-stepped cone $b'$, loosely mounted on a shaft $b$ of the fixed puppet B. This cone $b'$ is firmly connected with a toothed pinion $b^2$, which meshes with a gear $b^3$, Fig. 7, mounted on the same sleeve as a pinion $b^4$, which meshes with a gear $b^5$, keyed on the shaft $b$ in such a manner that by means of these intermediate gears the cone $b'$ will transmit to the shaft $b$ a rotary movement of a speed which can be varied as required. At its end the shaft $b$ carries a circular plate $c$, provided with a diametrical groove, in which is adjustably arranged a crank-pin $c'$. For this purpose the pin is provided with a screw-threaded eye, with which a screw $c^2$ engages. On this screw is mounted a beveled gear $c^3$, gearing with a similar gear $c^4$, fixed on an axle having a squared end, so that it can be turned with a key, so as to actuate the screw to move the pin $c'$ nearer to or farther from the center of the plate $c$. On this pin $c'$ is mounted a connecting-rod $c^5$, connected with a plate $c^6$, Figs. 5, 6, and 7, which can be transversely moved on a guide $c^7$.

This plate $c^6$ acts as a tool-carrier, and for this purpose it supports the tool by means of a number of suitably-combined carriers or parts. The first, $p$, Figs. 6 and 7, of these carriers can be adjusted on the plate $c^6$ by the rotation of a screw 1. The second, $p'$, has a movement perpendicular to the former by turning of a screw 2. On this second carrier $p'$ is rotatably arranged a third, $p^2$, which can be turned by rotating a worm-screw 3, with which it engages, and finally a fourth cylindrical carrier $p^3$, in which is fixed the tool $y$, is mounted in a casing which is pivoted at $p^4$ to the carrier $p^2$. The carrier $p^3$ is provided with a set of teeth meshing with a worm 4, carried in the casing, by means of which it can be made to turn around its axis. On the shaft of worm 4 is loosely mounted a drum $p^5$, Figs. 4 and 6, around which a cord $p^6$ is wound, the ends of which are secured to adjustable holders on supports fixed on the guide $c^7$. The drum $p^5$ is frictionally mounted upon the shaft 4; but it carries within it bearings pressed against the said shaft by springs in a manner to constitute a friction-mounting, compelling the drum to turn by friction the shaft 4 in its rotation. Causing the shaft $b$ of the fixed part B to rotate at a suitable speed, and in consequence the crank-disk $c$, Fig. 5, the face-plate $c^6$ will partake of an alternate rectilineal movement on the guide $c^7$ by means of the stud $c'$ and the rod $c^5$. The travel of this tool-carrier is easily regulated by suitably adjusting the pin $c'$ in the groove of the plate $c$ by actuating the screw $c^2$ in the manner already described. The hinge-pin of the connecting-rod $c^5$ of the plate $c^6$ may also be adjusted in a groove in the latter for the purpose of adjusting the position of the tool, and the screwing up of its nut insures its fixed position. The position of the tool can be adjusted in the following manner: By moving the tool-carriers $p$ and $p'$ by turning the screws 1 and 2 the tool $y$ is brought exactly into the center line $z\ z$, Fig. 7, which line is the line of intersection between a vertical plane passing through the axis of the pivot $f$ and a horizontal plane passing through the top of the cone of the blank about to be cut. By turning the circular carrier $p^2$ by working screw 3 the necessary inclination is given to the tool $y$, and by turning, by means of the screw 4, the sleeve $p^3$, which carries the tool, the tool is made to turn around its axis, so as finally to occupy the position which is most suitable for the purpose. At the beginning of each reciprocating movement the drum $p^5$ moves by spring-friction the pivot $p^4$ of the tool in one direction or the other in such a way that during the forward movement the tool, which may rotate around the axle $p^4$, is pressed against the carriage $p^2$ and raised during the return stroke, so as not to rub against the blank to be cut. The cord $p^6$ offers the great advantage that it adapts itself easily to all the positions of the tool-carrying device $c^6$ and of the tool itself, while its tension devices serve to regulate its engagement on the drum $p^5$.

*Work-support.*—Opposite to the fixed stock B there is secured to a support $C^2$ a movable stock C, provided with a shaft $k'$, which carries at one of its ends a plate $k^2$, with circular grooves serving for the fixing of the blank $x$ to be cut. A central bar can pass through the hollow shaft $k'$, so as to help in fixing of the work, as clearly represented in Fig. 5. The support $C^2$ of the movable head carries a screw $o$, engaging in a nut $o'$ of the head C and squared at its end, so as to be turned, by means of a hand-crank $o^2$, for the purpose of conveniently adjusting the movable head C. Besides, this movable head C, with all its mechanism and its support $C^2$, can turn around a central shaft $f$ and be fixed in any required position by means of T-bolts or the like, the heads of which engage with a correspondingly-shaped groove provided in the table $C'$. The latter is provided with a toothed sector $n$, with which engages a worm-screw $n'$, Fig. 5, the shaft of which is connected by conical gears $n^2$, Figs. 1 and 7, with a rod $n^3$, squared at one end for the purpose of being turned by a hand crank or key. The sector $n$ is provided with a tooth for every degree, equal to three hundred and sixty teeth for the whole circumference, so that by making a complete turn of the shaft $n^3$ the movable head is displaced to the extent of one degree. Moreover, on the shaft $n^3$ is provided a circular indicator $n^4$, by means of which even fractions of a degree can be very exactly set. Further, the table $C'$ has a scale divided into degrees and fractions, in combination with which an index-pointer on the movable head works, as represented in Fig. 7. The blank $x$ about to be cut being fixed by the shaft $k'$ on the movable head or on the plate $k^2$, mounted on this shaft, the blank is placed in the required position, so that the vertex of its cone lies in the axis of the shaft $f$. This head C moves in dovetail grooves in the part $C^2$ and can be fixed in the required position by tightening the bolts $C^3\ C^3$, Fig. 2. After this adjustment it is necessary to bring the blank $x$ into such a position that one of the generatrices of the cone corresponding to the bottom of the teeth should be in the straight line described by the tool $y$, which, as described, moves in a plane passing through the geometric axis of the spindle $f$. In order to obtain this adjustment, the blank $x$ is turned around the shaft $f$ by turning the shaft $n^3$, by means of a key placed on its squared end, in consequence of which the gear-wheels $n^2$ will also turn and one of them will involve in its movement the worm $n'$, thus moving the toothed sector involving the movable support $C^2$, as well as the head C, with the blank $x$, which is thus easily brought into the required position. By screwing down the bolts $m'\ m^2$ the support $C^2$ is firmly secured in place. As the angle at the vertex of the cone of the bottom of the teeth of the blank to be cut is known, this circular adjustment is easily obtained by bringing the zero-index of the support C² opposite to the number which denotes this angle on the degree-scale division of the fixed table C'. From what has been described above it will easily be understood that a turn of the handle of the shaft $n^3$ will produce a displacement of the axis of the movable head by one degree, and as the circular index $n^4$ is divided into minutes and fractions of minutes the angular adjustment can be carried out with all the precision desired.

*Mechanism for rotating the blank during the cutting to cause the tool to travel in a helical path on the periphery of the blank and to space the teeth.*—The pinion $b^2$ of the cone $b'$ gears with a wheel $i$, Fig. 5, rigidly connected to the bevel-gear $i'$, loosely mounted with another similar gear $i^2$ on a shaft $i^3$. These two gears, which gear with a third intermediate bevel-gear $i^4$, supported by the same frame as shaft $i^3$, have their hubs provided with clutches, so that either can be coupled with a clutch-sleeve $i^5$, keyed on the shaft $i^3$, but capable of being longitudinally displaced on said shaft. By means of a set of gear-wheels $i^6$, provided, as in thread-cutting machines, with a suitable support, the shaft $i^3$ can transmit the movement to another shaft $i^7$, provided with a gear $i^8$, gearing with a wheel $i^9$, with a double set of bevel-teeth, which turns around the shaft $f$, having suitable intermediate sleeves, as clearly shown in Fig. 5. The wheel $i^9$ gears with another wheel $i^{10}$, Figs. 6 and 7, mounted on a sleeve which surrounds a shaft $e^9$ with a similar wheel $i^{11}$, which by transmission-gearing $i^0$, Figs. 4, 6, and 7, transmits the movement to a pinion $i^{12}$, which gears with a gear $i^{13}$, Fig. 7, with a double set of teeth, the cylindrical set of teeth gearing with a wheel $h'$. The gear $i^{13}$ is mounted on a sleeve surrounding a screw-threaded shaft $g$. The gear $h'$ is split for part of its length and can be clamped to its shaft $h^2$ by means of a bolt $h^3$. On the shaft $h^2$ is keyed a screw $h$, arranged between the arms or ends of a support $h^4$. The worm-screw $h$ gears with a wheel $k$, Figs. 4 and 5, keyed in a longitudinal groove of the hollow shaft $k'$ of the movable head C in such a manner as to permit this shaft to be longitudinally displaced by sliding in the hub of the wheel $k$.

It appears from what precedes that the gear $b^2$ may transmit the rotary movement to the blank to be cut and that this blank will turn in one direction or the other according as the clutch-shaft $i^5$ is connected with one or the other of gears $i'$ and $i^2$. This blank has thus a continuous turning movement round its axis and the tool has an alternate rectilinear movement following a generatrix of the cone of this gear, as stated above. The connection of the two movements is obtained by means of gear-wheels $i^6$, which are so combined that the number of turns of the gear $b^2$ is proportional to the number of turns of the blank. In other words, if the blank is to have $n$ teeth the tool will make a complete reciprocating movement to and for each time that the blank turns $\frac{1}{n}$ of a revolution. Inasmuch as these two movements are mathematically unalterable and continue without stop, the result is that the division is absolutely correct, the tool making successively a full stroke on each of the teeth. It will be also understood, on the other hand, that the tool describing in its course a generatrix terminating at the apex of the cone while the blank is turning around in a continuous manner will describe on the blank a helicoidal curve the inclination of which only depends on the number of teeth and the stroke of the tool. Hence the operator will not have to trouble about the helicoidal movement, which will be produced by itself automatically by mounting the gearing $i^6 i^6$ appropriate for the number of teeth to be cut and by regulating the stroke of the tool, the latter depending on the length of the teeth. When the operator is cutting the second blank, which is intended to gear with the first-cut gear, he will in no wise alter the course of the tool, since the length of the tooth remains the same. He will simply mount the set of gearing $i^6 i^6$ according to the number of teeth of this second gear, and he will change the direction of the helix by a simple movement of the clutch $i^5$ $i'$ $i^2$ $i^3$ $i^4$, which produces the necessary alteration of direction. Under these conditions the two gears cannot fail to gear with each other. One will have its helix directed to the left, while the other, as is necessary, has it directed to the right. Moreover, the different points of the two helices of two meshing gears will be in contact with each other at every moment or point of movement. In reality the movement of the tool instead of being uniform is a uniformly-varied movement of the kind of those whose law is graphically represented by a sinuous curve, because the tool is actuated by a connecting-rod and crank. This movement is preferably adopted instead of a uniform rectilineal alternate movement, so as to avoid shocks and backlash which are produced in the latter movement when change in the direction of travel takes place, while the movement by connecting-rod and crank being uniformly varied avoids such shocks and insures a practically exact division, while at the same time the progressive variation of speed secures a better engagement of the tool with the material. It is only necessary to be careful to arrange in setting the complementary pinions to be cut according to the same marks with regard to the travel of the tool, so that any slight difference in the sinuous curve will occur in the same manner in the two gears, and consequently there will be no inconvenience. Thus, according to Fig. 9, where the tool is represented as being at the beginning of its advancing movement, if $c$ represents its path of travel and $l$ the length of the teeth it will be necessary to place the two complementary gears to be cut at the same distances $a$ and $b$ from the end of the travel of the tool. Finally, the helicoidal movement is produced automatically and requires no calculation. It is sufficient to employ the same movement of the tool for the two complementary gears and to set both identically relatively to this movement.

*Mechanism for giving an additional rotation to the blank at the end of each revolution and for feeding the tool so as to produce the tooth-curve.*—The guide $c^7$ is not fixed, but is provided with a cylindrical hub, which is revolubly mounted in a support $c^8$, Fig. 5, and provided with peripheral teeth gearing with a toothed wheel $d$. This wheel $d$ gears with another wheel $d'$, the latter in its turn gearing with another wheel $d^2$, keyed to one end of a shaft $d^3$, while the other end of this shaft is provided with a toothed pinion $d^4$, which gears with a rack-bar $d^5$, Figs. 1, 5, and 6, on a carrier $d^6$, guided in a suitable groove. This carrier $d^6$ serves as a guide for another carrier $d^7$, Figs. 6, 10, provided with a nut $d^8$, in which engages a screw $e$, mounted by means of its two ends in a support $e'$, connected with the lower extremity of the central shaft $f$ of this part of the machine. The screw $e$ is provided at one of its ends with a gear $e^2$, Fig. 6, meshing with a similar gear $e^3$, mounted on the same shaft as a conical gear $e^4$, the latter gearing with a bevel-wheel $e^5$, mounted with a similar wheel $e^6$ on a sleeve $e^7$, which turns with a slight friction on the shaft $f$. The bevel-wheel $e^6$ gears with a gear $e^8$, the shaft of which, $e^9$, is provided with a toothed wheel $e^{10}$, gearing with a similar toothed wheel $e^{11}$, mounted on another shaft $e^{12}$, Figs. 4 and 7, which by means of intermediate gearing $e^{13}$ communicates its movement to a shaft $e^{14}$, provided at one of its extremities with a gear $e^{15}$. This latter gears with a similar gear $e^{16}$, mounted on the shaft $g$, provided with a screw-thread and squared at each end in order to receive a hand-crank or key for the purpose of turning it by hand. This screw $g$ engages with a nut $h^5$, carried by the support $h^4$ of the endless screw $h$, which for this purpose can slide on its shaft $h^2$ by means of a key. With the worm-wheel which transmits the movement of the endless screw $h$ to the shaft $k'$, carrying the blank to be cut, as described above, is secured a toothed wheel $l$, gearing with another similar wheel $l'$, mounted on a shaft with the plate $l^2$, Figs. 2 and 4, provided with a diametrical groove in which can be adjusted by means of a screw a crank-pin $l^3$. On this pin is mounted a connecting-rod $l^4$, which by suitable means can transmit the movement to a pawl $l^5$, which can be reversed from one side to the other, so as to be coupled in any direction required with a ratchet-wheel $l^6$, mounted on the shaft $e^{14}$, carrying the gear $e^{15}$, which engages the screw $g$, as stated above. If then the machine is working, the worm-wheel $k$, turning at a constant speed, as stated, will actuate once in every revolution by means of the toothed wheels $l$ and $l'$ the crank-disk $l^2$, the latter actuating the connecting-rod $l^4$ and the pawl $l^5$. Inasmuch as the wheels $l$ and $l'$ are equal, the pawl $l^5$ will move the ratchet-wheel $l^6$ through a fraction of its revolution for every turn of the wheel $k$ and of the blank $x$. The ratchet-wheel $l^6$ involves in its rotary movement the gears $e^{15}$ and $e^{16}$ and the screw $g$. The nut $h^5$, and consequently the support $h^4$, receives a longitudinal movement, during which the worm-screw $h$ acts like a rack-bar on the wheel $k$, thereby turning the latter, as well as the blank $x$. On the other hand, the ratchet-wheel $l^6$ involves in its movement the shaft $e^{14}$, Fig. 7, gears $e^{13}$, shaft $e^{12}$, gears $e^{11}$ and $e^{10}$, shaft $e^9$, Fig. 6, gear $e^8$, wheel $e^6$, sleeve $e^7$, wheel $e^5$, the gears $e^4$ $e^3$ $e^2$, and, finally, the screw $e$. The latter communicates a translatory movement to the carriers $d^7$ $d^6$ and rack $d^5$, the latter turning the gears $d^4$ $d^2$ $d'$ $d$ and the slide $c^7$, which is actuated by its toothed part $c^9$. The plates $c^6$, and consequently the tool $y$, participate in the rotary movement of the guide $c^7$, the result of which is that the point of the said tool is moved relatively to the blank $x$, which turns like the tooth of a wheel engaging with it, and this relative movement as regards the said blank is an involute of the circle according to which the teeth of the blank $x$ are cut.

The mechanism just described is naturally based on the properties of the curve named the involute of a circle. It is known that two wheels of the same pitch cut according to an involute will always gear with each other whatever be the number of their teeth. The limit-wheel of bevel-gears is a crown-gear the angle at the vertex of which is one hundred and eighty degrees, and all wheels which will gear with the same crown-gear will gear with each other. It should be remembered that the pitch cone of this limit-wheel being a plane the shape of the teeth will be the same as that of the teeth of a rack-bar—i. e., they will be formed by straight lines, as represented in Fig. 8. It is therefore sufficient to gear the blanks to be cut with the limit-wheel by giving them the movement which they would have if they were to gear together in order that this limit-wheel should cut on the blank being operated on a tooth in the form of an involute. Evidently the same result would be obtained if instead of an actual limit-wheel a simple tool were employed for cutting the teeth the straight flanks of which are easily traced and which could be so worked as to generate the surface of the limit-wheel itself. Approximately, so as to avoid any adjustment being carried out by the attendant for $\frac{1}{2} \alpha$, the half-angle at the apex of the cone from the bottom of the teeth is taken. This angle may vary from zero to ninety degrees. The speed of the tool $y$ is always less than that of the blank $x$ to be cut. Consequently it is preferable that this movement should be transmitted through this gear to the tool. This rotary movement takes place slowly, as described, and only at the completion of each revolution of the gear being cut when the tool has passed over each of its teeth. It would be easy to demonstrate that the relation between the angular rapidity of the tool and the blank to be cut must be equal to $\frac{1}{2}\alpha$. This mathematical relation is obtained by the combined movement of the shafts $d^6$ and $d^7$. (Diagrammatically illustrated in Fig. 10.) It should be observed that nut $d^8$ describes a path parallel to the nut $h^5$. The two perpendicular carriers $d^6$ and $d^7$ are moved along the sides of a rectangular triangle the hypotenuse of which is the straight line described by the nut $d^8$; but as the same operation of adjusting the position of the blank $x$ to be cut by means of the rotation of the support $C^2$ on the axis $f$, this support forms an angle $\frac{1}{2}\alpha$ with the transversal carrier $d^6$, it follows that this carrier $d^6$, provided with the rack $d^5$, passes through the length of travel of the nut $h^5$ multiplied by $\sin \frac{1}{2}\alpha$. It is this amount which is transmitted to the wheel $c^9$ by the intermediate action of the wheels $d^4$ and $d^2$, respectively proportional to the wheels $k$ and $c^9$ and also by the intermediate wheels $d$ and $d'$. There is thus established between the rotary movements of the tool $y$ and the blank about to be cut the required proportion of the angular speeds equal to $\sin \frac{1}{2}\alpha$. The result is that the tool $y$ will gear as the tooth of a wheel with the blank $x$ and will describe on the latter an involute of a circle according to which the teeth are marked out no matter how great the angle $\alpha$ at the top of the primary cone may be. The pitch of the screws $g$ and $e$ is such that their rotation is effected in a suitable direction. The handle placed on one of the ends of the screw-shaft $g$ allows this rolling movement to be brought about by hand.

*Stop mechanism.*—The gear-wheel $c^9$ of the guide $c^7$ is itself in gear with a rack $r$, provided with a groove in which at a suitable distance apart two stops $s$ $s$, Figs. 1, 2, and 3, provided with inclined planes, are fixed adapted to strike against a roller $t'$, Fig. 1, provided at the end of a sliding rod $t$, connected to a three-armed lever $t^2$. One of these arms is provided with a finger $t^3$, adapted to engage with one of two recesses provided on a sector $u$, the opposite arm of said lever being constantly pressed upward by a spring-piston $v$, which forces the finger $t^3$ to engage in either of the two recesses of the sector $u$ which may come under it. This sector $u$ is rigidly united with a lever $u'$, which is connected to a rod $u^2$, provided at one of its ends with a belt-shifting fork $u^3$. This automatic uncoupling is regulated by the position and the distance between the inclined plane stops $s$ $s$ on the rack-bar $r$. The latter receives from the wheel $c^9$ an ascending or descending movement, according to whether a right or left hand gear is being cut. At a certain moment one of the stops $s$ meets the roller $t'$ and moves it and with it the rod $t$. The latter causes the lever $t^2$ to oscillate, whereupon the finger $t^3$ leaves the recess in the sector $u$ in which it was engaged, and the lever $u'$ under the action of some suitable spring is energetically drawn to the right, Figs. 1 and 5, in such a manner that the shaft $u^2$ and the fork $u^3$ are moved in the same direction, owing to which the belt is shifted from the fast to the loose pulley $a'$, thereby stopping the machine automatically as soon as the tool $y$ has finished its work. At this moment the finger $t^3$ under the action of the small spring-piston $v$ becomes engaged in the other recess of the sector $u$ and causes the lever $u'$ to oscillate until the finger engages in the other recess, a position which corresponds with the position of the belt on the fixed pulley $a^2$.

*Lubrication.*—A small centrifugal pump F, actuated by the principal operating-shaft $a$, draws up oil from a reservoir F' to force it out on the tool through a suitable conduit, the superfluous oil being collected by gutters arranged for that purpose on the framework, which deliver it back to the reservoir F', from which it is drawn up again by the pump for further use in connection with the tool $y$.

*Operation of the machine.*—The operation of the present machine is described above quite fully. However, it is to be seen that the support $h^4$, which carries the shaft of the endless screw $h$, operating by means of the wheel $k$, the shaft $k'$ of the blank $x$ can turn a certain distance around the screw $g$. The wheel $k$ is thus thrown out of gear in such a way that it can be turned very quickly by hand in order to effect the centration of the pinion $x$. This movement of the screw $h$ also allows the latter to be brought toward or from the wheel $k$ more or less in order to take up any slack. Of course it is evident that only one side of the tooth is cut at a time and that the second side is obtained in the same manner after the blank has been moved to an extent corresponding to the width of the space between the teeth. For this purpose the clamp $h^3$ has to be unscrewed so that the wheel $k$ and also the shaft $k'$, with the blank $x$, may be turned by hand through an angle corresponding to the thickness of the teeth by means of the shaft $h^2$ and endless screw $h$.

Having now fully described my invention, what I claim as new herein, and desire to secure by Letters Patent, is—

In a machine for generating gear-teeth, the combination of a pivotally-mounted guide, a tool-slide reciprocable thereon carrying a cutting-tool, and means to reciprocate said slide on said guide, of an angularly-adjustable work-table, carrying a rotatable work-support, means to rotate said support including a worm-wheel mounted thereon, a train of gearing connecting said worm-wheel with the means for reciprocating the tool-slide, said train of gearing passing through the pivot of the angularly-adjustable work-table, so that its operation is not affected by any adjustment of the work-table, means operated by the aforesaid worm-wheel once in each revolution thereof to turn the guide of the tool-slide about its axis and to give an additional rotation to the blank-support, so that the tool will be fed into the blank in such a way as to generate the proper tooth-curve.

Signed at Paris, France, this 29th day of November, 1899.

LÉON FRANÇOIS ACHILLE MONNERET.

Witnesses:
PAUL BACARD,
EDWARD P. MACLEAN.